(12) United States Patent
Yang et al.

(10) Patent No.: US 12,510,751 B2
(45) Date of Patent: Dec. 30, 2025

(54) OPTICAL BEAM DIRECTOR

(71) Applicant: Baraja Pty Ltd., North Ryde (AU)

(72) Inventors: Wenjian Yang, North Ryde (AU); Fernando Diaz, North Ryde (AU)

(73) Assignee: Baraja Pty Ltd., North Ryde (AU)

( * ) Notice: Subject to any disclaimer, the term of this patent is extended or adjusted under 35 U.S.C. 154(b) by 555 days.

(21) Appl. No.: 17/821,805

(22) Filed: Aug. 24, 2022

(65) Prior Publication Data

US 2024/0069330 A1 Feb. 29, 2024

(51) Int. Cl.
| | |
|---|---|
| *G02B 5/18* | (2006.01) |
| *G01S 7/481* | (2006.01) |
| *G02B 5/04* | (2006.01) |
| *G02B 26/10* | (2006.01) |

(52) U.S. Cl.
CPC .......... *G02B 26/106* (2013.01); *G01S 7/4811* (2013.01); *G02B 5/04* (2013.01); *G02B 5/1828* (2013.01)

(58) Field of Classification Search
CPC ...... G02B 26/106; G02B 5/04; G02B 5/1809; G02B 5/1828; G02B 5/1861; G01S 7/4811; G01S 7/4817; G01S 17/42
See application file for complete search history.

(56) References Cited

U.S. PATENT DOCUMENTS 4,428,676 A * 1/1984 Chastang ............... G01B 11/00
353/70

7,319,559 B2 * 1/2008 Nakama ............... G02B 5/1823
359/569
2019/0265574 A1 * 8/2019 Skirlo ................... G02F 1/3136
(Continued)

FOREIGN PATENT DOCUMENTS

| WO | WO-2017054036 A1 * | 4/2017 | ............. G01C 3/08 |
| WO | WO-2019046895 A1 * | 3/2019 | ............. G01S 17/89 |
| WO | WO-2019084610 A1 * | 5/2019 | ............. G01S 17/89 |

OTHER PUBLICATIONS

Concave Diffraction Grating Spectrograph, 2006, pp. 1-10 [online], [retrieved Mar. 13, 2025], retrieved from the Internet <URL: https://web.archive.org/web/20181024194121/https://courses.washington.edu/phys331/concave_grating/concave_grating.pdf>. (Year: 2006).*

(Continued)

*Primary Examiner* — Jennifer D. Carruth
(74) *Attorney, Agent, or Firm* — Stratford Group Ltd.

(57) ABSTRACT

Disclosed herein is a chip-based optical beam director, the beam director including: an input to receive light of a range of different wavelengths, including a light of a first wavelength channel and a light of a second wavelength channel, different to the first wavelength channel; an output to emit directed light from the optical beam director; a dielectric layer on an insulator; and at least one set of multiple subwavelength structures formed in the dielectric layer in a light path from the input to the output, each set of the multiple subwavelength structures having a periodic arrangement or semi-periodic arrangement, the periodic or semi-periodic arrangement causing the first wavelength channel to be dispersed in a first direction within the light path and the second wavelength channel to be dispersed in a second direction within the light path, different to the first direction.

15 Claims, 6 Drawing Sheets

(56) References Cited

U.S. PATENT DOCUMENTS

2021/0072531 A1* 3/2021 Ashida ............... G01S 7/4814
2024/0272513 A1* 8/2024 Liu ..................... G02F 1/292

OTHER PUBLICATIONS

Bradley J. Tame et al., Steerable Risley Prism Antennas with Low Side Lobes in the Ka Band, 2010, pp. 1-4 [online], [retrieved Mar. 10, 2025], retrieved from the Internet <URL: https://ieeexplore.ieee.org/stamp/stamp.jsp?tp=&arnumber=5611931>. (Year: 2010).*

D.J. Mar et al., Micromachined Silicon Grisms for Infrared Optics, 2011, pp. 1-46 [online], [retrieved Mar. 12, 2025], retrieved from the Internet <URL: https://web.archive.org/web/20111230123140/https://www.as.utexas.edu/astronomy/research/people/jaffe/pub/Mar.submitted.to.AO.v1.57.pdf>. (Year: 2011).*

Hiroshi Ono et al., Polarization-sensitive Diffraction in Vector Gratings Combined with Form Birefringence in Subwavelength-periodic structures Fabricated by Imprinting on Polarization-sensitive Liquid Crystalline Polymers, 31 Journal of Optical Society of America B 11-19 (2014). (Year: 2014).*

Hongchao Cao et al., High-efficiency Fused-silica Reflection Grism, 53 Applied Optics 2802-2805 (2014). (Year: 2014).*

Design of Diffraction Gratings, 2015, pp. 83-135 [online], [retrieved Mar. 11, 2025], retrieved from the Internet <URL: https://web.archive.org/web/20151106142117/https://spie.org/samples/TT62.pdf>. (Year: 2015).*

William M. Holden et al., A Compact Dispersive Refocusing Rowland Circle X-ray Emission Spectrometer for Laboratory, Synchrotron, and XFEL Applications, 88 Review of Scientific Instruments 073904-1 to 073904-10 (2017). (Year: 2017).*

T.E. Rudenko et al., The Advancement of Silicon-on-insulator (SOI) Devices and Their Basic Properties, 23 Semiconductor Physics, Quantum Electronics & Optoelectronics 277-252 (2020). (Year: 2020).*

Yong-Fang Xie et al., Traceable and Long-range Grating Pitch Measurement with Picometer, 478 Optics Communications 126316-1 To 126316-8 (2020). (Year: 2020).*

Nathan Dostart et al., Serpentine Optical Phased Arrays for Scalable Integrated Photonic Lidar Beam Steering, 7 Optica 726-733 (2020). (Year: 2020).*

Introduction to Diffraction Grating, 2021, pp. 1-5 [online], [retrieved Mar. 11, 2025], retrieved from the Internet <URL: https://web.archive.org/web/20210203211318/https://www.thorlabs.com/catalogpages/802.pdf>. (Year: 2021).*

Diffraction Grating Physics, 2021, pp. 1-4 [online], [retrieved Mar. 11, 2025], retrieved from the Internet <URL: https://web.archive.org/web/20210303001608/https://www.newport.com/n/diffraction-grating-physics>. (Year: 2021).*

Yong Liu et al., Silicon Optical Phased Array with a 180-degree Field of View for 2D Optical Beam Steering, 9 Optica 903-907 (2022). (Year: 2022).*

* cited by examiner

OPTICAL BEAM DIRECTOR

FIELD

The present disclosure generally relates to components for directing light into multiple directions. More particularly, embodiments of the present disclosure relate to a beam director for use in a light detection and ranging (LiDAR) system.

BACKGROUND

Optical beam direction has various applications, including to light-based spatial estimation, in particular LiDAR applications, in which light is sent into an environment for mapping purposes. In two or three-dimensional mapping by a LiDAR system, one of the dimensions relates to the range of a point from the origin of the optical beam, whereas the other one or two dimensions relate to one or two-dimensional space across which the light is directed. Locations within these dimensions may be referenced by a Cartesian coordinate system, a polar coordinate system or another coordinate system.

Light-based spatial estimation systems, in particular LiDAR systems, are of significant interest across several industries. One industry in which light-based spatial estimation systems has application is vehicle driver assistance and vehicle automation, including autonomous or semi-autonomous vehicles. For example, a LiDAR system may detect characteristics of an environment (whether it be land, sea or air) of a vehicle, enabling an automated response to the detected environment.

A range of spatial estimation systems and associated techniques for determining the spatial profile of an environment are described in the international application no. PCT/AU2016/050899, published as WO 2017/054036 A1. The entire content of this international application is hereby incorporated into this disclosure by reference.

As in many industries, the size of the components, cost of production and assembly complexity are relevant considerations to the design of a beam director, including in LiDAR systems, in addition to performance parameters such as the range of operation, resolution and field of view (FOV).

Reference to any prior art in the specification is not an acknowledgement or suggestion that this prior art forms part of the common general knowledge in any jurisdiction or that this prior art could reasonably be expected to be combined with any other piece of prior art by a skilled person in the art.

SUMMARY OF THE DISCLOSURE

According to a first aspect, there is provided a chip-based optical beam director, the beam director including: an input to receive light of a range of different wavelengths, including a light of a first wavelength channel and a light of a second wavelength channel, different to the first wavelength channel; an output to emit directed light from the optical beam director; a dielectric layer on an insulator; and at least one set of multiple subwavelength structures formed in the dielectric layer in a light path from the input to the output, each set of the multiple subwavelength structures having a periodic arrangement or semi-periodic arrangement, the periodic or semi-periodic arrangement causing the first wavelength channel to be dispersed in a first direction within the light path and the second wavelength channel to be dispersed in a second direction within the light path, different to the first direction.

According to a second aspect, there is provided a method of optical beam direction, the method comprising: providing, to an optical chip, light comprising a range of wavelengths, including a light of a first wavelength channel and light of a second wavelength channel, different to the first wavelength channel; directing, within the optical chip, the light onto at least one periodic or semi-periodic subwavelength structure, wherein the subwavelength structure does not confine the light in a plane of the subwavelength structure, to thereby direct the first wavelength channel in a first direction and the second wavelength channel in a second direction, different to the first direction; and outputting light, including at least the light of the first wavelength channel and the second wavelength channel.

According to a third aspect, there is provided a spatial estimation system including: a chip-based optical beam director according to the first aspect; a light transmitter for generating outgoing light and providing the outgoing light to the chip-based optical beam director; and a light receiver to detect light reflected by an environment and generate a signal indicative of the light reflected by the environment.

Further embodiments will become apparent from the following description, given by way of example and with reference to the accompanying drawings.

DETAILED DESCRIPTION OF THE EMBODIMENTS

A beam director for directing light into multiple directions is described. Embodiments of the beam director are suitable for spatial profiling applications, which generate an image, for example a three-dimensional image, of a surrounding environment. The following description is provided primarily with reference to this application.

"Light" hereinafter includes electromagnetic radiation having optical frequencies, including far-infrared radiation, infrared radiation, visible radiation and ultraviolet radiation. A light-based spatial estimation system may be referred to as a LiDAR system. LiDAR involves transmitting light into the environment and subsequently detecting the light returned by the environment. A spatial estimation of the environment may be formed based on the detected returned light.

Embodiments of a spatial estimation system including the disclosed optical beam director may be useful in monitoring an environment, including relative movement or change in the environment with respect to the optical beam director. As the vehicle and/or one or more environmental objects move, the spatial profile as viewed from the vehicle may change and may be re-estimated.

For example, in the field of autonomous or semi-autonomous vehicles (land, air, water, or space), a spatial estimation system can estimate from the vehicle's perspective a spatial profile of the environment in which the vehicle is to navigate, including the distance to environmental objects, such as an obstacle or a target ahead. For example, in an autonomous land vehicle, the estimated spatial profile may include objects such as a road ahead, other vehicles, pedestrians, animals, objects on or near the road and road signs.

As another example, in the field of ship docking, the spatial estimation system can estimate from a container ship's perspective a spatial profile a spatial profile of the dock, such as the proximity of the container ship to particular parts of the dock, to facilitate successful docking.

As yet another example, in the field of line-of-sight communication, such as free space optical or microwave communication, the spatial estimation system may be used for alignment purposes. Where a transceiver in the communication system has moved or is moving, it may be tracked so as to align the optical or microwave beam.

As further examples, the applicable fields for systems including an embodiment of the disclosed beam director include but are not limited to, industrial measurements and automation, site surveying, safety monitoring and surveillance, robotics and machine vision, printing, projectors, illumination, attacking and/or flooding and/or jamming other laser and IR vision systems.

Figure 1:
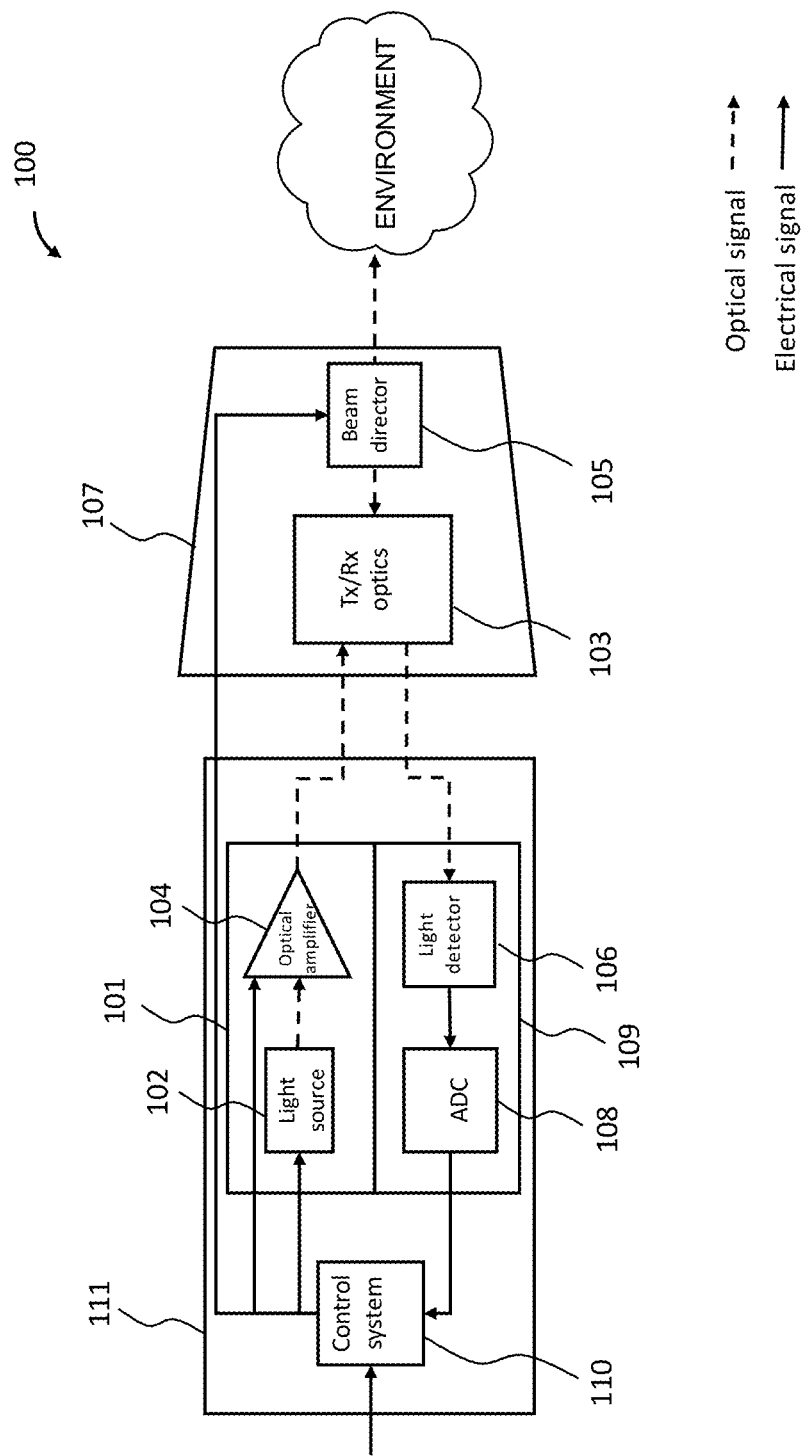
FIG. 1 illustrates an example arrangement of a spatial estimation system.

FIG. 1 illustrates an example arrangement of a spatial estimation system 100. As shown in the figure key, in the diagram electrical connections (e.g. analogue or digital signals) are represented by solid lines and optical connections (e.g. guided or free space optical transmission) are represented by dashed lines. The blocks represent functional components of the spatial estimation system 100. It will be appreciated that functionality may be provided by distinct or integrated physical components. For example, a light source may include an integrated amplifier and/or an integrated modulator.

The system 100 includes a light transmitter 101 for generating outgoing light. The light transmitter 101 may include a light source 102. In one example, the light source 102 includes a wavelength-tunable light source, such as a wavelength-tunable laser diode, providing light of a tunable wavelength. The wavelength may be based on one or more electrical currents (e.g. the injection current into the one of more wavelength tuning elements in the laser cavity) applied to the laser diode. The light source 102 accordingly is configured to provide outgoing light at a selected one or more of multiple wavelength channels (each represented by its respective centre wavelength $\lambda_1, \lambda_2, \ldots \lambda_n$). The light source 102 may include a single tunable laser or more than one tunable laser (or other types of lasers). The light source 102 may select one wavelength channel at a time or may simultaneously provide two or more different selected wavelength channels (i.e. channels with different centre wavelengths). In another example, the light source 102 may include a broadband light source and one or more tunable spectral filters to provide substantially continuous-wave (CW) light intensity at the selected wavelength(s). In another example, the light source 102 includes multiple laser diodes, each being wavelength-tunable over a respective range and whose respective outputs are combined to form a single output. The respective outputs may be combined using a wavelength combiner, such as an optical splitter or an arrayed waveguide grating (AWG).

In one arrangement, the light source 102 is configured to provide the outgoing light to include at least one time-varying profile at the selected one or more of the multiple wavelength channels. The time-varying profile may be used in determining a round trip time of light from light source 102 that is reflected back to the spatial estimation system, which indicates a range between the spatial estimation system 100 and the surface that reflected the light. The light source 102 may include a modulator (not shown) for imparting a time-varying profile on the outgoing light. This modulation may be in addition to any wavelength tuning as herein before described. In other words, the modulation is of light at the tuned wavelength. It will be appreciated that the tuned wavelength may refer to a centre frequency or other measure of a wavelength channel that is generated. The time-varying profile may, for example, be one or more of a variation in intensity, frequency, or phase imparted to the outgoing light. In some embodiments, the light source 102 emits pulses of light, which pulses may include the time-varying profile. In other embodiments, the difference between the presence of a pulse and the absence of a pulse is a time-varying profile for use in determining the round trip time of light. In other embodiments, the outgoing light from the light source 102 has a different form, for example individual pulses and the spatial estimation system detects the round trip time of the individual pulses, instead of detecting the round trip time of a series of modulated pulses. Techniques for determining the spatial profile of an environment are described in the incorporated international application no. PCT/AU2016/050899 (WO 2017/054036 A1).

In some embodiments, the light transmitter 101 also includes an optical amplifier 104 to amplify light from the light source 102. In some embodiments the optical amplifier 102 is an Erbium-doped fibre amplifier (EDFA) of one or more stages. In other embodiments one or more stages of a semiconductor optical amplifier (SOA), a booster optical amplifier (BOA), or a solid state amplifier (e.g. a Nd:YAG amplifier) may be used. It will be appreciated that a modulator may be located either before or after the optical amplifier 104 in the outgoing light path. In some embodiments, the optical amplifier 104 may be omitted.

In some embodiments the light transmitter 101 includes a sampled-grating distributed Bragg reflector (SG-DBR) laser. By way of example, the SG-DBR laser may be controllable to provide 10 Gbps modulation, may operate across a 35 nm wavelength range and change from one wavelength to another in less than 1 microsecond, such as less than 500 nanoseconds, less than 250 nanoseconds, or less than 100 nanoseconds. The wavelengths may have centre frequencies about 20 MHz or more apart.

In some embodiments the outgoing light from the light transmitter 101 is received by transmission (Tx) optics for directing light to a beam director 105. In some embodiments, the transmission optics form a light transceiver 103, configured to both provide outgoing light to the beam director 105 and receive collected incoming light from the beam director 105. In the embodiments where there is a transceiver 103, optical components, such as an optical circulator may be in the light path, so as to direct received light to the detector circuitry 105. For example, an optical circulator may be located before or after the transceiver 103. Examples of optical circulators are described in PCT/AU2018/051175, published as WO 2019/084610 A1 (Baraja Pty Ltd), which is hereby incorporated herein by reference. In other embodiments, the outgoing and incoming lights paths may be separate, in whole or in part. For example, in other embodiments, the receiver aperture and associated components (i.e. reception (Rx) optics) for receiving the incoming light may not form part of the transmission optics for outgoing light (not shown). In these embodiments, the transmission optics or a transceiver may be omitted.

The beam director 105 functions to direct light over one or two dimensions into the environment to be estimated by the spatial estimation system 100. In some embodiments, the beam director 105 includes bidirectional components, whereby both the outgoing light to the environment and incoming light from the environment traverse substantially the same path through the beam director 105, in opposite directions. FIG. 1 illustrates a bidirectional example for the optical signal traversing the beam director 105 and represents the directionality with a bidirectional arrow.

The beam director 105 operates to direct light based on wavelength and may include dispersive or refractive elements to direct light of different wavelengths in different directions. In some embodiments, the beam director 105 includes a combination of light directing components selected from diffractive, refractive and reflective components. In some embodiments, the light source 102 is a tunable light source to provide light at different wavelengths at different times and the beam director is wavelength dependent, for example configured with diffractive and/or refractive components to direct the different wavelengths in different directions.

In some embodiments, the diffractive and/or refractive components are used in combination with a mechanical beam director, whereby the combined steering by the components directs the light over a field of view (FOV) of the spatial estimation system 100. For example, the FOV may extend across two dimensions with the wavelength based components providing direction over one dimension and the mechanical based components providing direction of the other dimension. An example mechanical beam director includes one or more rotating mirrors. Other examples of mechanical beam direction include mechanically rotating one or more diffractive or refractive components that are used for wavelength-based beam direction. In other embodiments the direction is solely by wavelength dependent components, to provide light across one or two dimensions.

In some embodiments the spatial estimation system operates to sequentially direct light to different locations within the FOV. In other words, the system scans or steers one or more light beams within the FOV. The scanning may be linear (e.g. like a raster scan) or non-linear. In embodiments using a combination of wavelength and mechanical beam steering, the scanning based on wavelength may be relatively faster than the scanning based on mechanical components.

The beam director 105 directs the incoming light to the reception optics (e.g. the light transceiver 103), which collects the light and passes it to a light receiver 109. The light receiver 109 may include light detector circuitry 106. The light detector circuitry 106 includes one or more photodetectors. An example photodetector is an avalanche photodiode (APD). The light detector circuitry 106 generates incoming electrical signals that are representative of the detected incoming light. The light detector circuitry 106 may include a trans-impedance amplifier following the APD. The light receiver 109 may also include an analog-to-digital converter (ADC) 108 following the light detector circuitry 106. The analog-to-digital converter 108 may convert analog incoming electrical singles to digital incoming electrical signals.

The incoming digital signals are received and processed by a control system 110. The light source 102 and the amplifier 104 may be also controlled by the control system 110. For example, one or both of a wavelength tunable laser (e.g. its wavelength) and a modulator (e.g. the modulating waveform) of the light source 102 may be controlled by the control system 110. The control system 110 may also control beam steering directions of the beam director 105, through e.g. wavelength-based steering and/or mechanical steering, for example for effecting a scan pattern. In some embodiments, for example where the beam director includes one or more microelectromechanical systems, the control system 110 may directly control the beam director 105 via an electrical signal. In other embodiments, for example implementing wavelength based steering, an electrical signal to the beam director 105 is not required. The control system 110 may determine ranges for spatial estimation based on its control or knowledge of the outgoing light and based on the incoming light signals.

The control system 110 may include an application specific device configured to perform the operations described herein, such as a configured programmable logic device implemented. The control system 110 may be a general purpose computing device with computer readable memory storing instructions to cause the computing device to perform the operations.

In the instance of an application specific device, the instructions and/or data for controlling operation of the control system 110 may be in whole or in part implemented by firmware or hardware elements, including configured logic gates in one or more integrated circuit devices. In the instance of a general purpose computing device, the control system 110 may include, for example, a single computer processing device (e.g. a central processing unit, graphics processing unit, or other computational device), or may include a plurality of computer processing devices. The control system 110 may also include a communications bus in data communication with one or more machine readable storage (memory) devices which store instructions and/or data for controlling aspects of the operation of the processing unit. The memory devices may include system memory (e.g. a BIOS), volatile memory (e.g. random access memory), and non-volatile memory (e.g. one or more hard disk or solid state drives to provide non-transient storage). The operations for spatial estimation are generally controlled by instructions in the non-volatile memory and/or the volatile memory. In addition, the control system 110 includes one or more interfaces. The interfaces may include, for example, a control interface with the light transmitter 101 and a communication interface with the light receiver 109. The control system 110 may also receive and process external information that is not derived from the spatial estimation system 100.

In some embodiments, light from the light source 102 is also provided to the light detector circuitry 106 to provide a reference signal via a light path (not shown) from the light source 102 the light detector circuitry 106. For example, the light from the light source 102 may enter a sampler (e.g. a 90/10 fibre-optic coupler), where a majority portion (e.g. 90%) of the light is provide to the transceiver 103 and the remaining sample portion (e.g. 10%) of the light is provided instead to the light detector circuitry 106. The light detector circuitry 106 may then be configured to inhibit detection of non-reflected light based on a difference in wavelength or modulation between the outgoing light and the non-reflected light. For example, the light detector circuitry 106 includes one or more balanced detectors to coherently detect the reflected light mixed with reference light at the one or more balanced detectors. The light receiver 109 may perform, for example, homodyne or heterodyne detection of the incoming light.

In the embodiment of FIG. 1, the spatial estimation system 100 separates the functional components into two main physical units, i.e. an engine 111 and a sensor head 107. In one example, the engine 111 and the sensor head 107 are substantially collocated. The collocation allows these components to be compactly packed within a single unit or in a single housing. In another example, the sensor head 107 is remote from the engine 111. In this example, the engine 111 is optically coupled to the remote sensor head 107 via one or more waveguides, such as optical fibres. In yet another example, a spatial estimation system 100 may include a single engine 111 and multiple sensor heads. Each of the multiple sensor heads may be optically coupled to the engine 111 via respective waveguides. The multiple sensor heads may be placed at different locations and/or orientated with different FOVs.

In some embodiments of a beam director, the diffractive and/or refractive components are distinct components, such as one or more individual gratings and/or prisms. However, such beam directors with distinct diffractive and/or refractive components may present assembly complexity in, for example, aligning the distinct components with each other and/or with the transceiver 103. Additionally or alternatively, such beam directors with distinct diffractive and/or refractive components may be bulky in size with relatively high cost of production as large active areas are required for a large aperture, which is desirable for providing a large FOV. It will be understood that the above issues may become more severe when multiple diffractive and/or refractive components are required to provide a desired amount of light dispersion.

The embodiments of beam director of the present disclosure are instead chip-based. A chip-based beam director may allow a reduced footprint and/or reduce optical alignment requirements, while providing useful light dispersion. In particular, a beam director, for example the beam director 105, is formed by subwavelength structures in a silicon on insulator (SOI) photonic platform, for on-chip beam steering.

Figure 2:
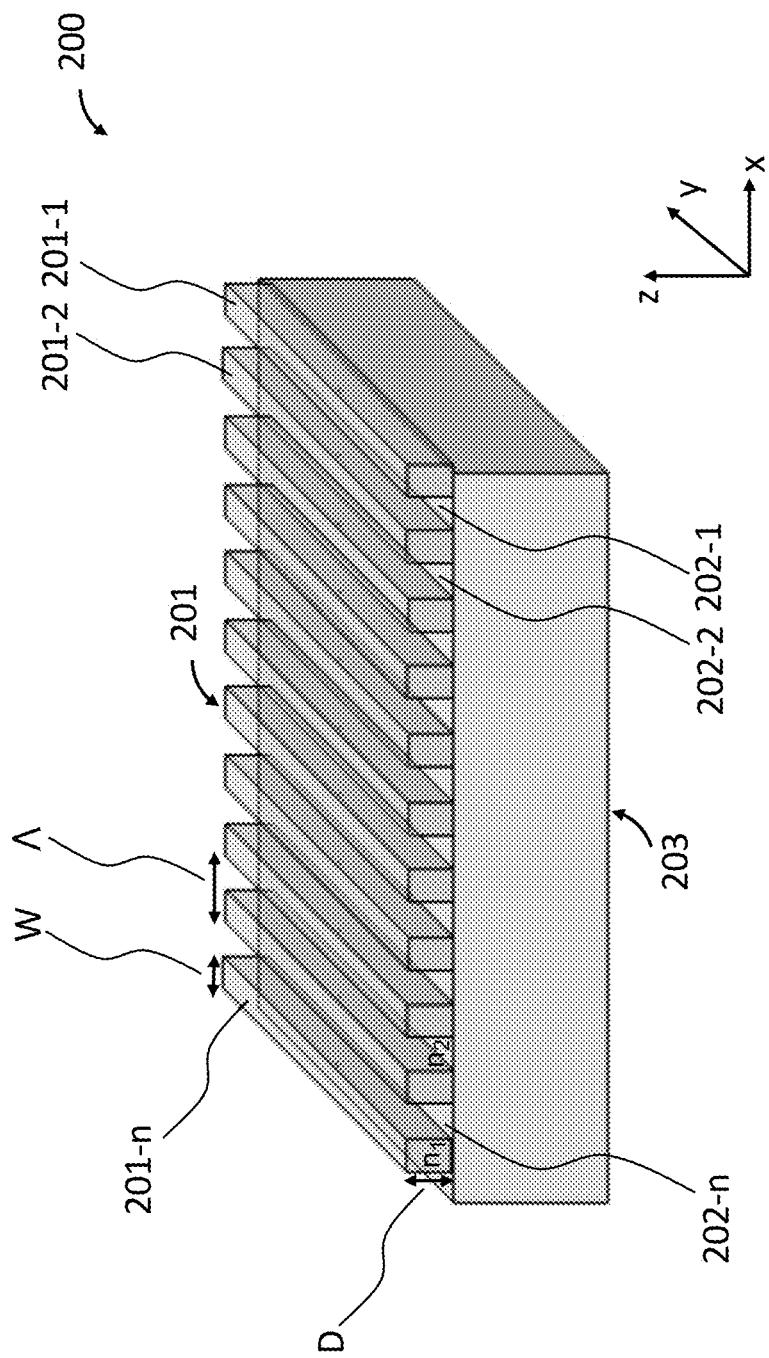
FIG. 2 illustrates an example of a chip-based subwavelength structured device.

FIG. 2 diagrammatically illustrates an example of a chip-based subwavelength structured device 200. In one example, the chip-based subwavelength structured device 200 is created by etching an SOI wafer. The 501 wafer includes an active layer 201 formed by a dielectric material, e.g., Si, having a refractive index $n_1$. In addition, the 501 wafer includes an electrically insulating layer 203, e.g. $SiO_2$. The active layer 201 is fabricated on the electrically insulating layer 203. The 501 wafer may also include a handle layer, not shown in FIG. 2, e.g. bulk silicon, on the opposite side of the insulating layer 203 to the active layer 201.

The subwavelength structured device 200 includes a plurality of subwavelength structured units 201-1, 201-2, ..., 201-n, which are etched on or in the active layer 201 in a periodic arrangement. Alternatively or additionally, the plurality of subwavelength structured units are arranged in a semi-periodic arrangement. A gap or groove 202-1, 202-2, ..., 202-(n−1) is between each pair of successive subwavelength structure units. As illustrated in FIG. 2, the periodic subwavelength structure units are distributed along a first dimension (e.g. a horizontal axis or x-axis). Alternatively (not shown), the periodic subwavelength structure units are distributed along both the first dimension and a second, orthogonal dimension (e.g. a lateral axis or x-axis, and a longitudinal axis or y-axis). Each subwavelength structure unit has a width (W) along the dimension with the periodicity of the plurality of subwavelength structure units and (i.e. along axis-x as illustrated in FIG. 2) and a depth (D) (i.e. along axis-z as illustrated in FIG. 2). A period of the plurality of periodic subwavelength structure units is denoted as $\Lambda$, which is smaller than one half of the smallest wavelength of light to be directed (i.e. originated from the light transmitter 101) (i.e. $\Lambda < \lambda/2$) where $\lambda$ is the effective wavelength in the medium), and so called a subwavelength period. The refractive index of the material of each gap or groove (202-1, 202-2, ..., 202-n) is denoted as $n_2$. In one example as shown in FIG. 2, the material of each gap or groove is air. In another example, each gap or groove may be filled with another dielectric material.

The subwavelength structure can be viewed as a homogeneous medium with a refractive index $n_{\textit{eff-x/y}}$, i.e. the refractive index for light with the electric field parallel to the periodic plane (e.g. the plane defined by x and y axes as shown in FIG. 2), and a refractive index $n_{\textit{eff-z}}$, i.e. the refractive index for light with the electric field perpendicular to the periodic plane (e.g. the z axis as shown in FIG. 2). Without being limited by theory, the respective effective indices may be given by:

$$n_{\textit{eff-x/y}} \approx \frac{W}{\Lambda}n_1^2 + \left(1 - \frac{W}{\Lambda}\right)n_2^2 + C\left(\frac{\Lambda^2}{\lambda^2}\right) \quad (1)$$

$$n_{\textit{eff-z}} \approx \frac{W}{\Lambda}n_1^{-2} + \left(1 - \frac{W}{\Lambda}\right)n_2^{-2} + C\left(\frac{\Lambda^2}{\lambda^2}\right) \quad (2)$$

wherein $W/\Lambda$ is known as fill factor and $C(\Lambda^2/\lambda^2)$ is a correction term in the order of $\Lambda^2/\lambda^2$.

For a particular wavelength of the incident light, the refractive indices of the subwavelength structured device 200 can be flexibly engineered. Variables affecting the refractive indices include the respective refractive indices of the subwavelength structured units (201) and the gaps or grooves (202) (i.e. $n_1$ and $n_2$) and the fill factor of the subwavelength structure (i.e. $W/\Lambda$).

As a result, by engineering with parameters $n_1$, $n_2$ and $W/\Lambda$ of a subwavelength structured chip, a beam director based on the subwavelength structured chip can be designed not to confine the light in one dimension of the subwavelength structure (e.g. either x or y) but to confine the light in a two-dimensional plane of subwavelength structure, and therefore to yield useful light dispersion light beam direction, based on its wavelength. The subwavelength structured chip may provide a continuously-addressable range of directions in-plane with the periodic structure of the subwavelength structured chip.

Figure 3:
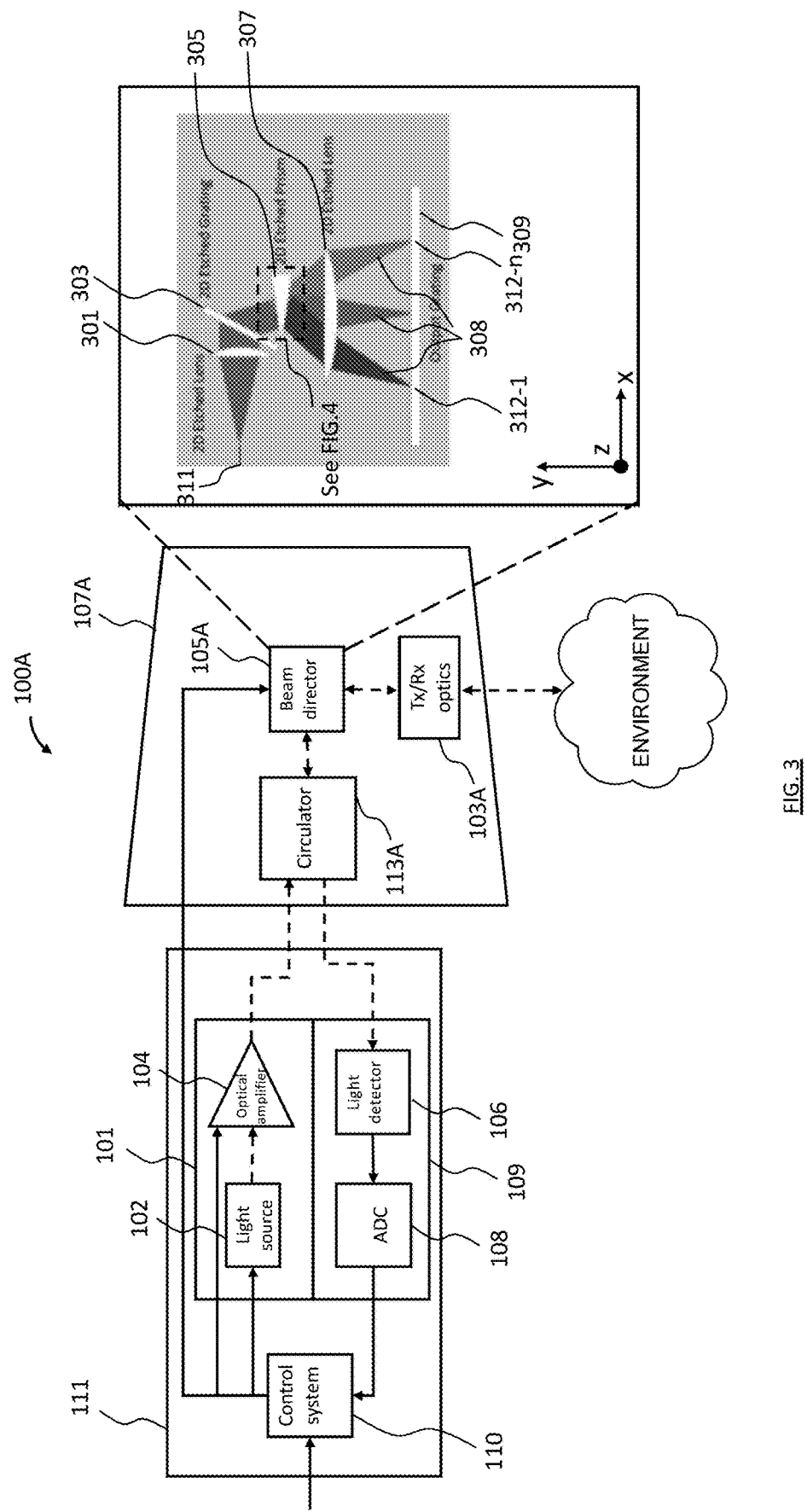
FIG. 3 illustrates an example arrangement of a spatial estimation system with an exemplary chip-based subwavelength structured beam director.

FIG. 3 illustrates an example arrangement of a spatial estimation system 100A with a chip-based subwavelength structured beam director 105A. In FIG. 3 like components and features to those described with reference to FIG. 1 are shown with like reference numerals.

In the arrangement as shown in FIG. 3, the spatial estimation system 100A includes an optical circulator 113A for bidirectional transmission. In one direction, the optical circulator 113A receives the outgoing light from the light transmitter 101 and directs the outgoing light to the chip-based subwavelength structured beam director 105A. In an opposite direction, the optical circulator 113A receives the reflected light and directs the reflected light to the light receiver 109. In other embodiments, the optical circulator 113A may be omitted. In the embodiments where the optical circulator 113A is omitted, the chip-based subwavelength structured beam director 105A receives the outgoing light from the light transmitter and directs the reflected light to the light receiver 109 with separate light paths, in whole or in part.

The chip-based subwavelength structured beam director 105A includes at least one input port (e.g. 311) to receive light of a range of different wavelengths, e.g. including a light of a first wavelength channel and a light of a second wavelength channel, different to the first wavelength channel. In some embodiments, the at least one input port may be coupled with the optical circulator 113A or the light transmitter 101 in the cases where the optical circulator 113A is omitted through one or more optical fibres. The chip-based subwavelength structured beam director 105A also includes at least one output port (e.g. 312-1, 312-n) to emit directed light from the chip-based subwavelength structured beam director. In some embodiments, the at least one or more output ports are coupled to free space. Herein, a "port" is intended to denote or illustrate a physical component, such as grating coupler, or an area in space, such as an aperture, through which a light beam passes, and does not necessarily require presence of a physical component to define the port. The chip-based subwavelength structured beam director 105A also includes one or more subwavelength structured patterns formed in a light path from the at least one input port to the at least one output port to effectively direct the light of a range of different wavelengths in different directions within the light path, i.e. to direct outgoing light over a first dimension (e.g. over a path that has a useful variation along the x-axis illustrated in the inset of FIG. 3), based on wavelength of the outgoing light. In the example as illustrated in the inset of FIG. 3, the chip-based subwavelength structured beam director 105A includes one or more 2D etched subwavelength structured patterns, each pattern functioning as one or more of lens(es), grating(s) and prism(s). In the example as illustrated in FIG. 3, the chip-based subwavelength structured beam director 105A includes a first subwavelength structured lens 301, a subwavelength structured grating 303, a subwavelength structured prism 305 and a second subwavelength structured lens 307, to provide on-chip steered light 308 with a useful amount of on-chip dispersion.

In some embodiments, the chip-based subwavelength structured beam director 105A includes one or more transmission gratings (e.g. the subwavelength structured grating 303). Additionally or alternatively, the chip-based subwavelength structured beam director 105A includes one or more reflective gratings. Additionally or alternatively, the chip-based subwavelength structured beam director 105A includes one or more blazed gratings. It will be appreciated that the blazed grating may be optimised to achieve greater grating efficiency in a given diffraction order compared to conventional transmission and/or reflective gratings. In this regard, optical power directed in a desired diffraction order can be maximised.

Figure 4:
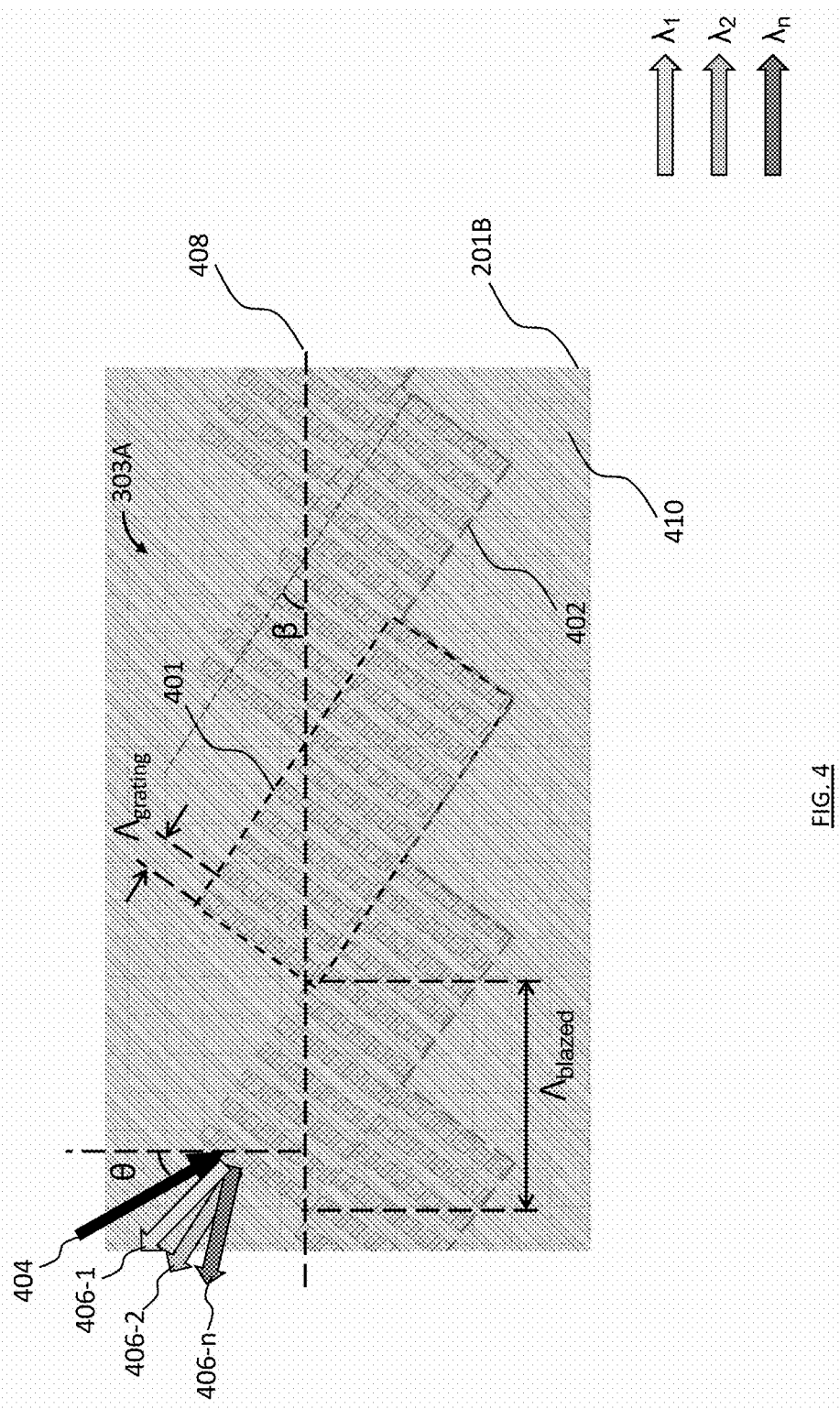
FIG. 4 illustrates an example of a chip-based subwavelength structured blazed grating.

FIG. 4 illustrates an example of the blazed grating 303A etched on an active layer 201B of a chip-based subwavelength structured beam director, for example the beam director 105A. The blazed grating 303A can be treated as a plurality of diffraction gratings (e.g. 401), placed next to each other, each of which is titled at angle β, called "the blazed angle". The outline of the plurality of diffraction gratings forms a sawtooth shape 402. Each of the plurality of diffraction gratings has a period $\Lambda_{grating}$ at or about the Bragg grating period of $2n_{eff}\lambda$, where is $n_{eff}$ is the effective refractive index of the blazed grating 303A. In one example, the plurality of diffraction gratings may each be realised by a subwavelength structure (not shown) to form a subwavelength structured blazed grating. In this example, the subwavelength structured blazed grating 303A has a blazed period $\Lambda_{blazed}$. The period $\Lambda_{grating}$ of the diffraction grating is in general larger than the period A of the underlying subwavelength structure. A light beam 404 containing multiple wavelengths ($\lambda_1, \lambda_2, \ldots,$ and $\lambda_n$) incident on the subwavelength structured blazed grating 303A with an incident angle θ is reflected with multiple light beams 406-1, 406-2, ..., and 406-n, each with a different direction based on its wavelength ($\lambda_1, \lambda_2, \ldots,$ and $\lambda_n$, respectively) forming an angular dispersion. Similarly, a light beam 404 that is tuned to each of the wavelengths $\lambda_1, \lambda_2, \ldots,$ and $\lambda_n$ over time will be directed in different directions over time.

In some embodiments, the blazed angle β of the one or more blazed gratings is larger than 45 degrees, to form one or more echelle gratings. The echelle grating(s) may have a relatively low gap or groove density. It will be appreciated that the echelle grating may provide increased dispersion amongst the output light beams 406-1, 406-2, ..., and 406-n. In some embodiments, the one or more echelle gratings may be arranged along a straight line 408 or a flat surface (e.g. surface 410 of the active layer 201B), as illustrated in FIG. 4. In other embodiments, the one or more echelle gratings may be arranged along a line or a surface that is curved in an opposite direction to a Rowland circle or a Rowland torus, respectively.

Although FIG. 4 illustrates a reflective blazed grating, it will be appreciated that the grating may be designed as a transmission grating, by choosing a blazed angle β to effect transmission at the wavelengths to the directed.

Figure 5:
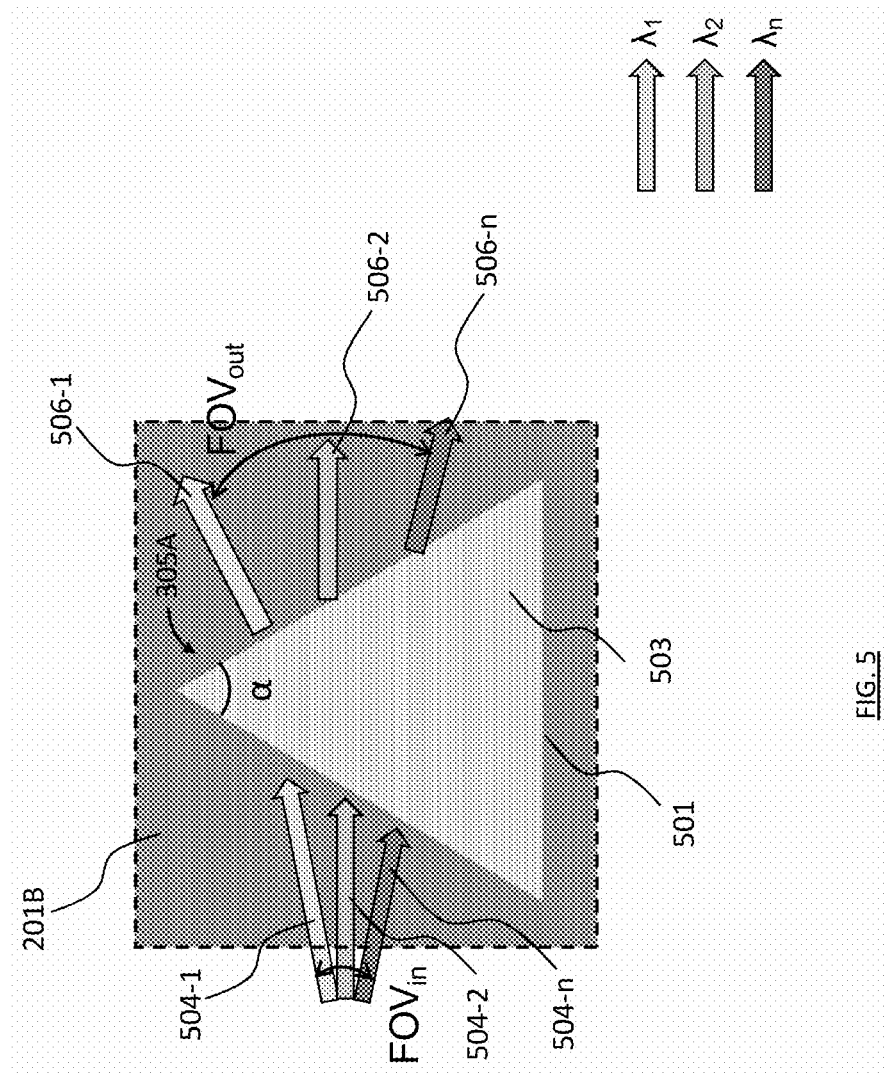
FIG. 5 illustrates an example of a chip-based subwavelength structured prism.

The chip-based subwavelength structured beam director, for example the beam director 105A, includes a subwavelength structured prism. FIG. 5 illustrates an example of a subwavelength structured prism 305A etched on the active layer 201B of the chip-based subwavelength structured beam director 105A. The subwavelength structured prism 305A may be formed with a triangle outline 501 within which a subwavelength periodic pattern 503 is created along one dimension. Apex angle (α) of the triangle outline 501 may be from 62 to 68 degrees. Permissible incident angles of light beams 504-1, 504-2, ..., and 504-n may be from 26 to 32 degrees, forming a 4-degree input FOV. For a spatial estimation system operating at around 1550 nm wavelength, the subwavelength periodic pattern 503 of the subwavelength structured prism 305A may have a depth selected from 180 to 220 nm, a period selected from 300 to 600 nm and a fill factor selected from 0.4 to 0.6. In one example, the effective refractive index of the subwavelength structured prism 305A is 1.7. In some embodiments, the subwavelength structured prism 305A receives light from the optical circulator 113A or from the light transmitter 101 in the cases where the optical circulator 113A is omitted. In other embodiments, the subwavelength structured prism 305A receives light from another subwavelength structured device that provides wavelength dispersion, to provide augmented dispersion.

Returning to FIG. 3, the chip-based subwavelength structured beam director 105A (or 105B or 105C) may also include an in-plane (or on-chip) subwavelength structured output grating (or grating coupler) 309. The output grating 309 receives the on-chip steered light and changes its in-plane direction to an out-of-plane direction (i.e. the direction that is not in the plane of the subwavelength structure(s) of the chip-based subwavelength structured beam director 105A (e.g. along z-axis as illustrated in the inset of FIG. 3). It will be appreciated that the on-chip subwavelength structured output grating may provide flexible coupling positions on chip and therefore relax strict alignment requirement for coupling the on-chip steered light into free space. For bidirectional embodiments, the grating coupler 309 also functions to couple out-of-plane light from free space for on-chip transmission and/or reception.

Figure 6:
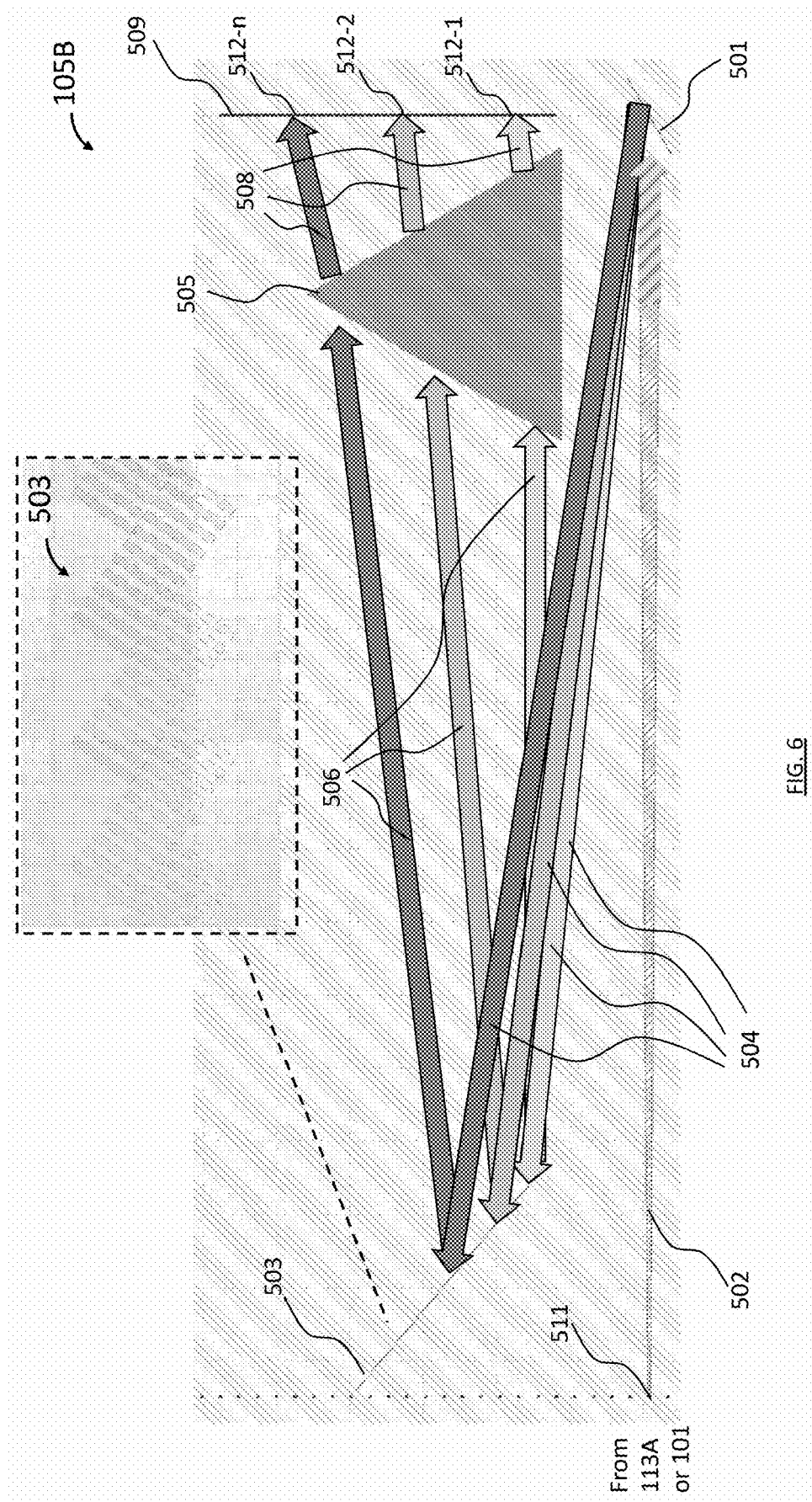
FIG. 6 illustrates another example of a chip-based subwavelength structured beam director.

FIG. 6 illustrates an exemplary arrangement of a chip-based subwavelength structured beam director 105B, including an echelle grating 503 (subwavelength structured or not), a subwavelength structured prism 505 and an output grating 509. In this example, the chip-based subwavelength structured beam director 105B includes a first grating 501 (subwavelength structured or not), which receives light 502 through at least one input port 511, from the optical circulator 113A or from the light transmitter 101 in the cases where the optical circulator 113A is omitted and outputs light 504 in a direction based on its wavelength. The light 504 is further received by the echelle grating 503, which provides additional dispersion in its output light 506, based on wavelength. The light 506 is received by the subwavelength structured prism 505, which outputs light 508 with further augmented dispersion. The output light 508 is then received by the output grating 509 for out-of-plane coupling into free space which outputs light from at least one output port (e.g. 512-1, 512-2, 512-n) of the chip-based subwavelength structured beam director 105B.

Returning to FIG. 3, the out-of-plane light from the chip-based subwavelength structured beam director 105A (or 105B) may be further received by transmission (Tx) optics 103A. The transmission optics may condition the light, for example, by including one or more collimators (e.g. collimating lens(es)) to form one or more beams of outgoing light into the environment to be estimated by the spatial estimation system 100A. In the bidirectional embodiments, the transmission optics form a light transceiver 103A, configured to both provide outgoing light to the environment and receive the reflected light from the environment. It will be appreciated that, with the chip-based subwavelength structured beam director 105A, the desired light dispersion can be created before the transmission optics or transceiver optics 103A (e.g. comprising one or more collimators), which may in turn increase the effective aperture of the overall system (e.g. sensor head 107A or spatial estimation system 100A) compared to creating light dispersion after the transmission or transceiver optics as e.g. in spatial estimation system 100 as shown in FIG. 1. The collimator can be a bulk optics lens or a subwavelength device (e.g. on the SOI substrate If the collimator is subwavelength structured, the subwavelength structured collimator may be part of the subwavelength structured beam director (e.g. before the output grating).

In some embodiments, the outgoing light directed over the first dimension may be further directed over a second dimension that is perpendicular to the first dimension. For example, further directing the outgoing light over the second dimension may be achieved by using one or more of (a) one or more chip-based subwavelength structured beam directors, (b) one or more distinct diffractive and/or refractive components, and (c) one or more mechanical steering components. Examples of a LiDAR system with both wavelength and mechanical based steering are described in the applicant's international patent application nos. PCT/AU2017/051395 (published as WO 2018/107237 A1) and PCT/AU2019/050437 (published as WO 2019/241825 A1). The content of both of these international patent applications is incorporated into this disclosure by reference.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A chip-based optical beam director, the beam director including:
   an input to receive light of a range of different wavelengths, including a light of a first wavelength channel and a light of a second wavelength channel, different to the first wavelength channel;
   an output to emit directed light from the optical beam director;
   a dielectric layer on an insulator; and
   one or more sets of multiple subwavelength structures formed on or in the dielectric layer in a light path from the input to the output, each set of the multiple subwavelength structures having a periodic arrangement, the periodic arrangement causing the first wavelength channel to be dispersed in a first direction within the light path and the second wavelength channel to be dispersed in a second direction within the light path, different to the first direction; and
   wherein at least one set of the one or more sets of multiple subwavelength structures is formed as a subwavelength structured blazed diffraction grating configured to direct the light on a plane defined by the dielectric layer, the subwavelength structured blazed diffraction grating having a periodic arrangement associated with a grating period, and a blazed period that is larger than the grating period.

2. The chip-based optical beam director of claim 1, comprising two or more sets of multiple subwavelength structures, and wherein at least one set is formed as a subwavelength structured prism.

3. The chip-based optical beam director of claim 2, wherein the subwavelength structured prism is configured to direct the light on the plane of the dielectric layer.

4. The chip-based optical beam director of claim 1, wherein the blazed diffraction grating is an echelle grating.

5. The chip-based optical beam director of claim 4, wherein the echelle grating is reflective.

6. The chip-based optical beam director of claim 4, wherein the echelle grating is arranged along a straight line or a flat surface.

7. The chip-based optical beam director of claim 4, wherein the echelle grating is arranged along a line that is curved in an opposite direction to a Rowland circle.

8. The chip-based optical beam director of claim 1, wherein the blazed diffraction grating is configured to receive outgoing light from a light source, and the subwavelength structured prism is configured to receive the outgoing light from the diffraction grating.

9. The chip-based optical beam director of claim 1, wherein the blazed diffraction grating is one of multiple diffraction gratings.

10. The chip-based optical beam director of claim 1, wherein the one or more sets of multiple subwavelength structures are etched on or in the dielectric layer.

11. The chip-based optical beam director of claim 1, wherein said grating period is less than one half of the wavelength of the lowest wavelength in the range of different wavelengths.

12. A spatial estimation system including:
   a chip-based optical beam director as claimed in claim 1;
   a light transmitter for generating outgoing light and providing the outgoing light to the chip-based optical beam director; and a light receiver to detect light reflected by an environment and generate a signal indicative of the light reflected by the environment.

13. The spatial estimation system of claim 12, including: at least one optical collimator configured to receive light from the chip-based optical beam director and output the light to the environment.

14. The spatial estimation system of claim 12 not including a discrete optical collimator between the light transmitter and the chip-based optical beam director.

15. A method of optical beam direction, the method comprising: providing, to an optical chip, light comprising a range of wavelengths, including a light of a first wavelength channel and light of a second wavelength channel, different to the first wavelength channel; directing, within the optical chip, the light onto one or more periodic subwavelength structures, wherein each of the subwavelength structures does not confine the light in a plane of the subwavelength structure, to thereby direct the first wavelength channel in a first direction and the second wavelength channel in a second direction, different to the first direction; and outputting light, including at least the light of the first wavelength channel and the second wavelength channel; and wherein at least one of the subwavelength structures is a subwavelength structured blazed diffraction grating configured to direct the light on a plane defined by the dielectric layer, the subwavelength structured blazed diffraction grating having a periodic arrangement associated with a grating period, and a blazed period that is larger than the grating period.

* * * * *